United States Patent
Rosenberg et al.

(10) Patent No.: US 10,096,985 B2
(45) Date of Patent: Oct. 9, 2018

(54) CABLE STORAGE MODULE

(71) Applicant: HEWLETT PACKARD ENTERPRISE DEVELOPMENT LP, Houston, TX (US)

(72) Inventors: Paul Rosenberg, Sunnyvale, CA (US); Alan Goodrum, Tomball, TX (US); Sarah Anthony, Houston, TX (US); Steven W Trovinger, Los Altos, CA (US); Kevin B Leigh, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/522,768

(22) PCT Filed: Oct. 31, 2014

(86) PCT No.: PCT/US2014/063337
§ 371 (c)(1),
(2) Date: Apr. 27, 2017

(87) PCT Pub. No.: WO2016/068984
PCT Pub. Date: May 6, 2016

(65) Prior Publication Data
US 2017/0331268 A1   Nov. 16, 2017

(51) Int. Cl.
*H02G 3/08*   (2006.01)
*H02G 11/02*   (2006.01)
*G02B 6/44*   (2006.01)

(52) U.S. Cl.
CPC .......... *H02G 11/02* (2013.01); *G02B 6/4403* (2013.01); *G02B 6/4441* (2013.01); *G02B 6/4457* (2013.01)

(58) Field of Classification Search
CPC .......... H02G 3/08; H02G 3/081; H02G 11/02; H02G 11/00; H02G 15/007; G02B 6/4403;
(Continued)

(56) References Cited

U.S. PATENT DOCUMENTS 5,669,571 A * 9/1997 Graybill ................. B65H 75/44
242/378.1
5,913,487 A   6/1999 Leatherman
(Continued)

FOREIGN PATENT DOCUMENTS

CN   202204979 U   4/2012
JP   2004-004862 A   1/2004
(Continued)

OTHER PUBLICATIONS

EMS Partners Inc., Wire and Cable Packaging, Handling, and Storage [online], Retrieved from the Internet Aug. 28, 2014, <http://www.emspartnersinc.com/images/Wire and Cable Packaging and Handling NewWireandCableHandling.pdf.
(Continued)

*Primary Examiner* — Angel R Estrada
(74) *Attorney, Agent, or Firm* — Nolte Intellectual Property Law Group

(57) ABSTRACT

A system includes a chassis having an interior containing at least one component secured to a base. A cable storage module is attached to the chassis and has a frame defining an interior space in which a cable is stored. The cable has a first end extending out of the frame for connection to the component and a second end extending out of the frame for connection to a device exterior to the chassis.

18 Claims, 16 Drawing Sheets

(58) Field of Classification Search
CPC ........ G02B 6/441; G02B 6/4457; G02B 6/44; G02B 6/4401
USPC ......... 174/50, 520, 68.1, 68.3, 135; 220/3.2, 220/3.3, 4.02; 385/134, 135
See application file for complete search history.

(56) References Cited

U.S. PATENT DOCUMENTS

| | | | |
|---|---|---|---|
| 6,870,095 B1 | 3/2005 | Whitted | |
| 7,898,117 B2* | 3/2011 | Bousseton | H05K 7/1492 307/156 |
| 8,465,318 B2* | 6/2013 | Kartes | H01R 13/465 439/501 |
| 8,605,459 B2* | 12/2013 | Papakos | H05K 7/1425 361/825 |
| 8,720,810 B2* | 5/2014 | Whitaker | H02G 11/02 242/388.6 |
| 8,746,606 B1* | 6/2014 | Murray | H01R 13/72 242/129 |
| 9,348,104 B2* | 5/2016 | Thijs | H05K 7/186 |
| 2009/0267712 A1 | 10/2009 | Zhou et al. | |
| 2011/0280536 A1 | 11/2011 | de los Santos Campos et al. | |
| 2012/0063718 A1 | 3/2012 | Steijer et al. | |

FOREIGN PATENT DOCUMENTS

| | | |
|---|---|---|
| JP | 2004-354545 A | 12/2004 |
| KR | 10-2005-0002451 A | 1/2005 |
| WO | WO-2013039783 A1 | 3/2013 |
| WO | WO-2014015902 A1 | 1/2014 |

OTHER PUBLICATIONS

PCT/ISA/KR, International Search Report, dated Jun. 30, 2016, PCT/US2014/063337.

* cited by examiner

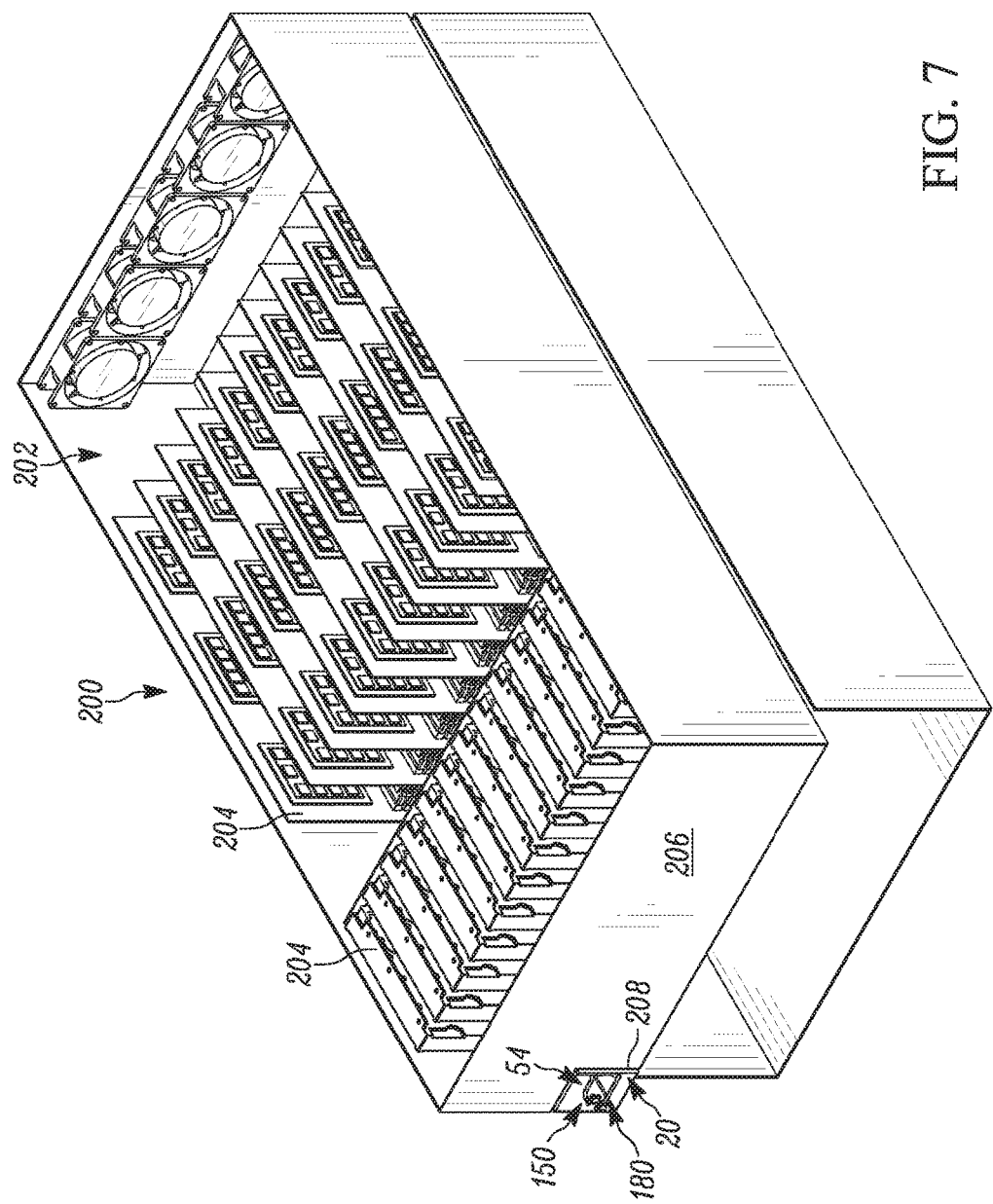

CABLE STORAGE MODULE

TECHNICAL FIELD

This disclosure relates to an apparatus for storing cables and, in particular, relates to a cable storage module.

BACKGROUND

Managing the connection of the three main systems deployed in data centers, namely, computing, networking, and storage, can be both technically challenging and, in some cases, expensive. Additionally, inefficient connections between components can degrade signal integrity, thereby resulting in a decrease in system performance.

BRIEF DESCRIPTION OF THE DRAWINGS

FIG. 6 is an enlarged view of a portion of FIG. 4 with the storage module of FIG. 1 positioned within the server enclosure.

FIG. 7 is a front view of the server enclosure of FIG. 4 with a front door closed.

DETAILED DESCRIPTION

This disclosure relates to an apparatus for storing cables and, in particular, relates to using a cable storage module to connect multiple boxes in a compact and efficient manner.

Figure 1:
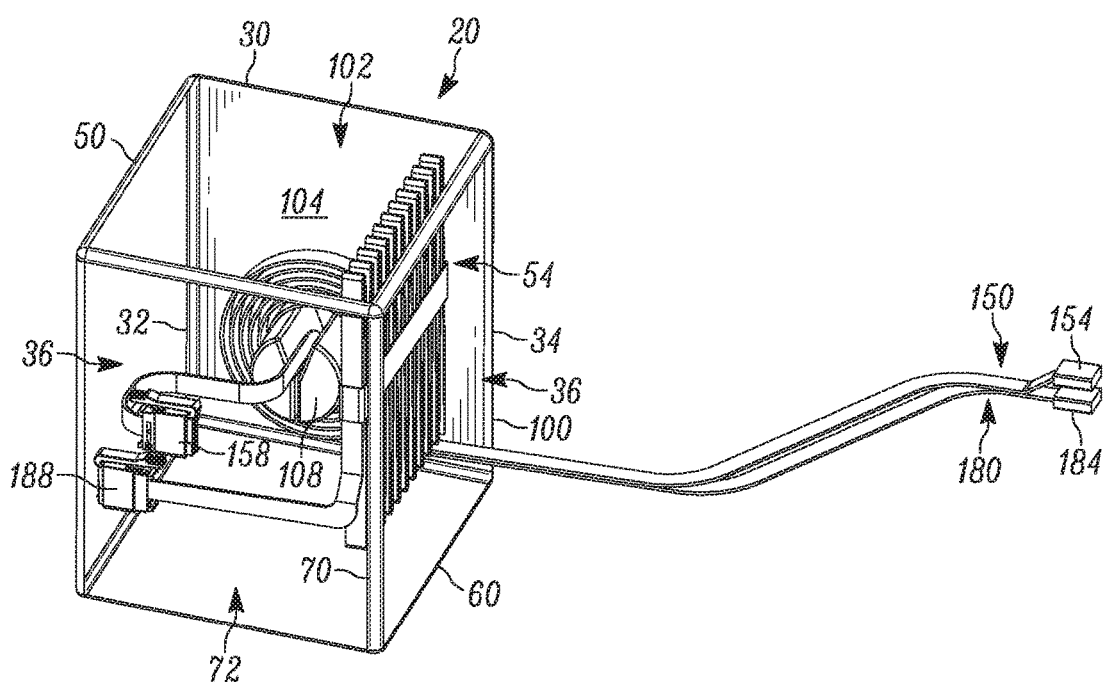
FIG. 1 is a schematic illustration of an example storage module for storing one or more cables.
Figure 2A:
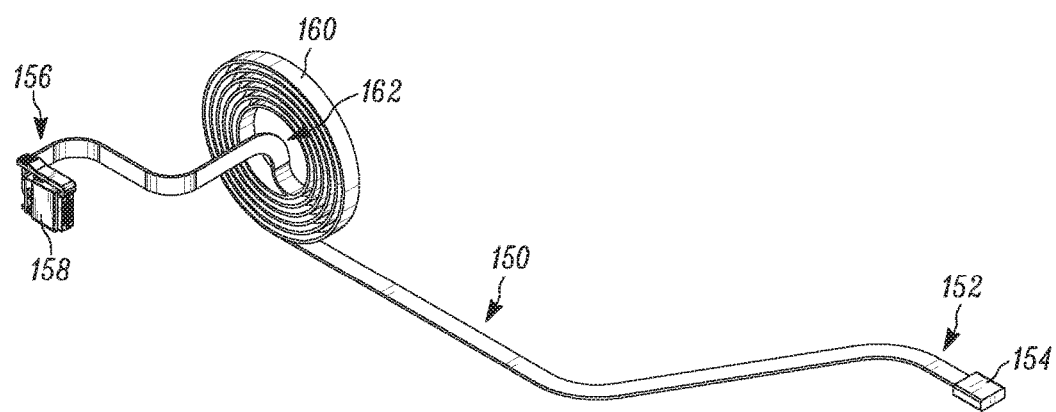
FIG. 2A depicts an example of a first cable that can be used with the storage module of FIG. 1.
Figure 2B:
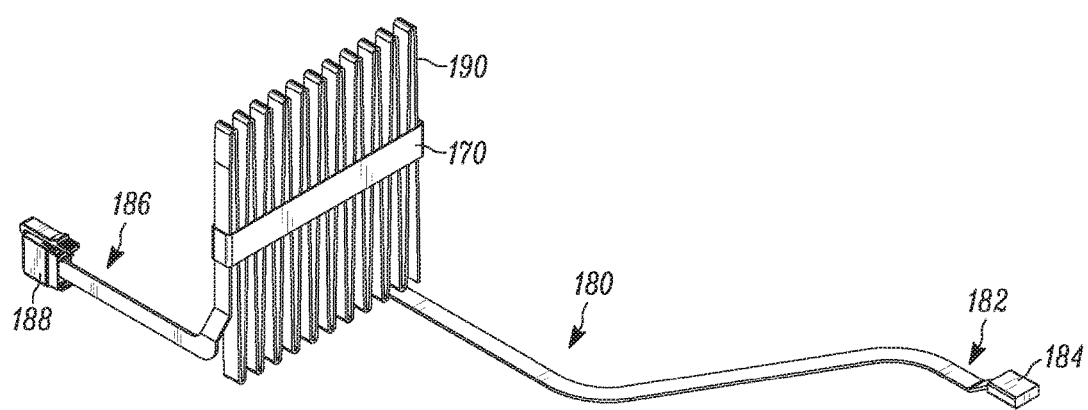
FIG. 2B depicts an example of a first cable that can be used with the storage module of FIG. 1.
Figure 3:
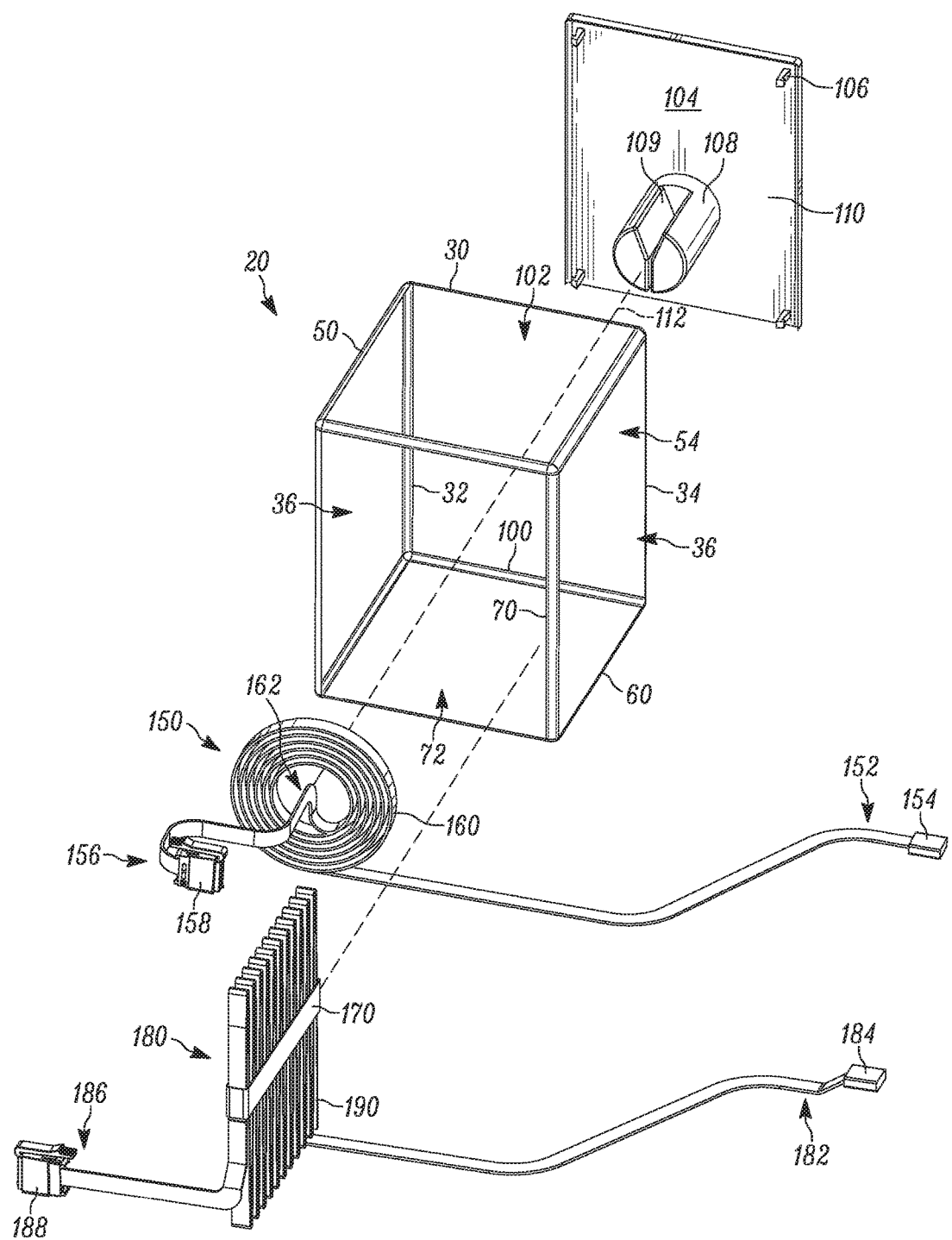
FIG. 3 is an exploded view of the storage module of FIG. 1.

FIGS. 1-3 illustrate an example cable storage module 20. Referring to FIG. 1, the storage module 20 includes a frame 30 having a plurality of walls 32, 34, 50, 60, 70, 100 defining an interior space 54 for storing one or more cables 150, 180. As shown, the one or more cables 150, 180 are provided for placement in and passage through the frame 30. Although the storage module 20 is shown and described as storing multiple cables 150, 180, any number of more or fewer cables can be provided in the storage module in other example embodiments. In the example of FIG. 1, the frame includes a front wall 70, a rear wall 100, a pair of side walls 32, 34, a top wall 50, and a bottom wall 60. Each side wall 32, 34 includes an opening 36. The front wall 70 includes an opening 72. The rear wall 100 includes an opening 102. As used herein, the terms "front", "rear", "side", "top", and "bottom" are not meant to be limiting, but merely reflect the orientation of the respective walls 32, 34, 50, 60, 70, 100 as they appear in the figures. It will be understood that the nomenclature used to designate each wall 32, 34, 50, 60, 70, 100 are interchangeable depending on the spatial orientation of the frame 30 in use.

Any one or more (e.g., up to including all) of the walls 32, 34, 50, 60, 70, 100 in FIG. 1 may constitute a hollow, rectangular or square frame. In other examples, one or more of the wall could be solid or include other types of passages extending therethrough to enable a length of cables to be withdrawn from the module for connection with a selected component external to the module. In the example construction of FIGS. 1-3, the openings 36, 72, 102 are unobstructed. The side wall 34 defines a frame that acts as a general guide for the cables 150, 180 stored in the interior space 54. In this construction, each one or more wall openings are unobstructed, such that the ends of the cables 150, 180 can be withdrawn through any open wall opening for connection to respective components (e.g., within a chassis and external to the chassis).

The hollow frame 30 may include a door 104 having a projection 108 for closing the opening 102 and helping to manage and retain the first cable 150 within the frame 30 (see FIG. 3). The door 104 may be releasably secured to the rear wall 100 via a snap-fit or other type of connection 106. Alternatively, in other examples, the door 104 may be secured to the rear wall 100 via a hinge (not shown). Regardless, the door 104 has an open condition positioned away from the opening 102 and a closed condition coplanar with the rear wall 100 and substantially covering the opening. A projection 108 extends outwardly from the inner surface 110 of the door 104 and into the interior space 54 when the door is secured to the frame 30 and closing the opening 102. The projection 108 may have a circular, polygonal or other shaped cross-section and extends along a centerline 112 that is substantially orthogonal to the surface 110 of the rear wall.

As shown in the example of FIG. 3, the projection 108 includes a radially extending notch 109 having a wedge shape, which can be substantially coextensive with the length of the projection. The notch 109 can provide a receptacle for receiving a length of cable. The notch 109 can also permit some flexion of portions of the projection on opposing sides of the notch with respect to the centerline 112, for example. In one example, the projection 108 may be fixed to the inner surface 110 of the door 104.

Referring to FIGS. 2A-2B, each of the cables 150, 180 may constitute various types of cables, which can depend on the type of application where the module is being used. Where the module 20 is to be used in computing or other electronic applications, the cables 150 and 180 can be power cables, electrical signal cables and/or optical fiber signal cables. The electrical cable may constitute, for example, an Ethernet cable (e.g., category 5, category 5E, category 6 or the like). In other examples, one or both cables 150 and 180 can be optical cables. The optical cable can include one or more optical fibers, such as a single or multi-fiber optical cable (e.g., plural fibers formed into bundles or ribbons). As another example, the cables 150 and 180 can be hybrid optical and electrical cables, such as can employ optical fibers to carry information and electrical conductors to transmit power and/or electrical signals. The cables 150, 180 may have any desired length suitable for the application used, for example, 1 m, 3 m, 5 m, 10 m, 30 m or other length that can depend on application requirements.

In one example, and referring to FIG. 2A, the cable 150 constitutes an optical fiber ribbon that is rolled for compact storage, which can be referred to as a rolled cable. The rolled cable 150 may alternatively be folded or otherwise placed in a compact condition. The rolled cable 150 extends from a first or input end 152 to a second or output end 156. A connector 154 is provided on the first end 152 and a connector 158 is provided on the second end 156. The connectors 154, 158 may each constitute any conventional computing connector known in the art. A portion 160 of the rolled cable 150 between the ends 152, 156 may be wound or rolled to minimize the length of the cable. The rolled portion 160 defines a passage 162, which may be circular or polygonal (not shown). The shape of the rolled portion 160 may be maintained using a zip tie (not shown) or the like. The length of one or both ends 152, 156 of the cable that extend from the rolled portion 160 can be adjusted by unrolling the ends 152, 156 from the outside or inside of the roll 160.

Referring to FIG. 2B, the folded cable 180 constitutes a length of an optical fiber ribbon that is folded for compact storage within the module 20. The cable 180 may alternatively be rolled or otherwise placed in a compact condition. The cable 180 extends from a first or input end 182 to a second or output end 186. A connector 184 is provided on the first end 182 and a connector 188 is provided on the second end 186. The connectors 184, 188 may each constitute any conventional computing connector known in the art. A portion 190 of the cable 180 between the ends 182, 186 may be folded in a bellows or accordion manner to reduce the length of the cable between the ends. The shape of the folded portion 190 may be maintained using a zip tie 170 or the like. The length of one or both ends 182, 186 of the cable that extend from the folded portion 190 can be adjusted by unfolding the ends 182, 186 from the either end of the folded portion 190.

Referring to FIGS. 1 and 3, to assemble the module 20, the door 104 for the rear wall 100 is opened or removed and the rolled cable 150 placed adjacent or abutting the inner surface 110 such that the projection 108 extends through the passage 162 in the rolled cable. The projection 108 and passage 162 may have a loose fit with one another allowing the rolled cable 150 to rotate about the projection. The second end 156 of the cable 150 is received in and extends through the notch 109 in the projection 108. The door 104 is then snap-fit to the frame 30 or hinged closed (not shown) such that the opening 102 is covered and the rolled cable 150, including both connectors 154, 158, is positioned within the interior space 54. The connector 154 on the first end 152 of the cable 150 is then fed through the opening 36 in the side wall 34 and the second end 156 of the cable 150 is subsequently fed through another opening of the module 20, as will be discussed.

The folded cable 180, including both connectors 184, 188, is positioned within the interior space 54 of the frame 30 adjacent to cable 150. In one example, the cable 180 is positioned along and parallel to the side wall 34 of the frame 30. The connector 184 on the first end 182 of the second cable 180 is then fed through the unobstructed opening 36 in the side wall 34 and the connector 188 on the second end 186 of the second cable 180 is subsequently fed through another opening of the module 20, as will be discussed. The first ends 152, 182 and the second ends 156 and 186 of the cables 150, 180 are movable and adjustable in length relative to the frame 30.

Figure 4:
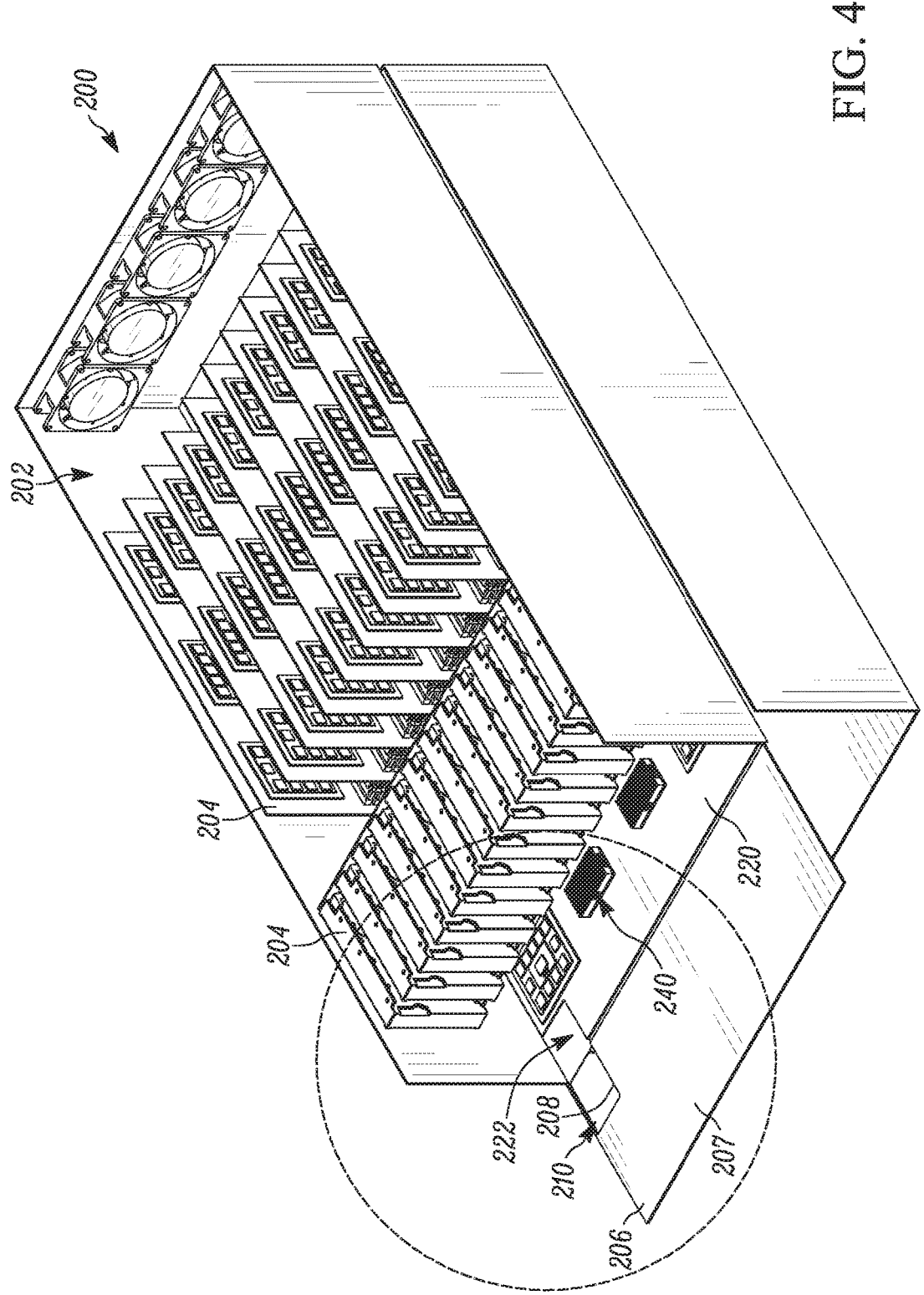
FIG. 4 is a front view of a server enclosure for use with the storage module of FIG. 1.
Figure 5:
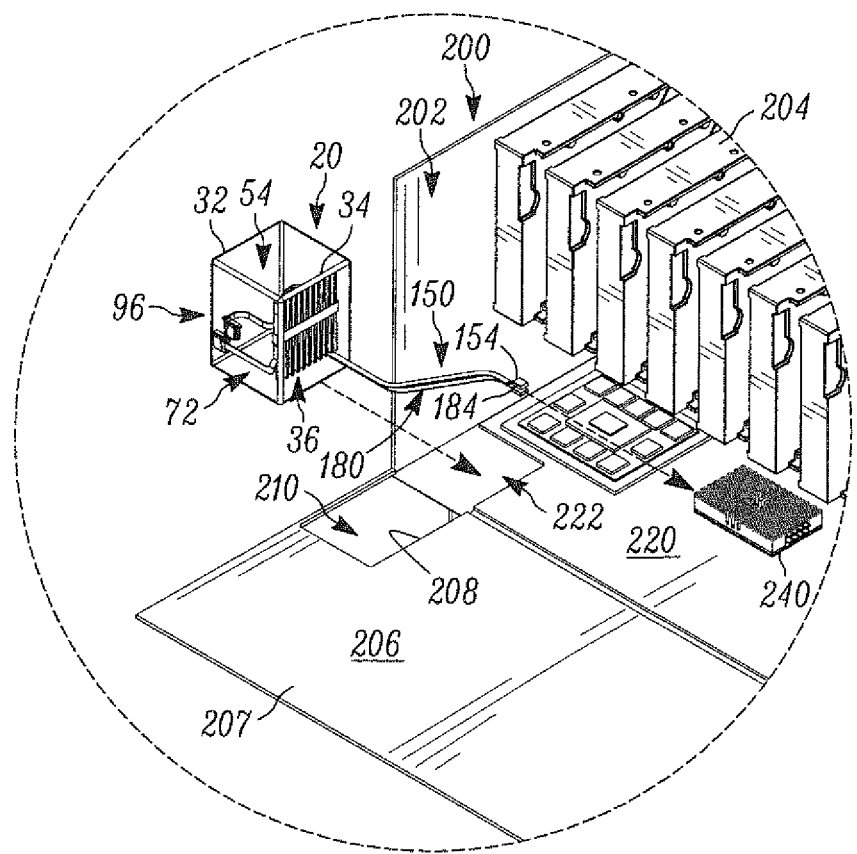
FIG. 5 is an enlarged view of a portion of FIG. 4 with the storage module being installed therein.

Referring to FIGS. 4-6, the module 20 is configured for placement in a computer system, such as used in data centers, such as a chassis or enclosure 200 for a computing, networking or storage system, to connect the data center to an external device (not shown). In one example, the enclosure 200 is part of a blade server system. Referring to FIG. 4, the server enclosure 200 defines an interior space 202 having a base 220, e.g., PCB, on which electrical components 204 for the server are mounted. One of the components 204 may constitute, for example, a transceiver 240. Other components 204 can include a plurality of server blades, backplane connectors or memory devices mounted in respective racks in the enclosure 200, for example.

The interior space 202 is selectively closed and accessed by a door 206 hinged to the server enclosure 200, for example. The door 206 includes a notch 208 defining an opening 210 extending entirely through the door such that the interior space 202 is accessible when the door is closed. The notch 208 may be coated or otherwise provided with an EMI or RFI resistant material (not shown).

Referring to FIGS. 5-6, with the door 206 of the server enclosure 200 opened, the cable storage module 20 is moved into the interior space 202. A notch or recess 222 may be provided in the base 220 of the server enclosure 200 for locating the cable storage module 20 in a predetermined location within the server enclosure. In one example as shown in FIG. 5-6, the cable storage module 20 is oriented such that the bottom wall 60 abuts the base 220. In this mounting example, the front wall 70 faces away from the interior space 202. In one position example for the cable storage module 20, the notch 222 may be configured such that the front wall 70 is substantially coplanar with the front of the server enclosure 200. Alternatively, the cable storage module 20 may extend through the front of the server enclosure 200 or be rearwardly offset from the front (not shown).

In another mounting example (not shown), a cable storage module 20 may be mounted on the base 220 where the transceiver 240 is mounted. The cable storage module 20 may have electrical connector (not shown) to couple to the base 220. In addition, the cable storage module 20 may have an EEPROM or other non-volatile memory device which in turn couples to the electrical connector on the cable storage module 20. The non-volatile memory device may contain information about the cable storage module 20, e.g., cable types and cable lengths.

The storage module 20 may simply reside within the notch 222 or be secured therein to the base 220 via adhesive, fastener, etc. (not shown). Regardless, the first ends 152, 182 of the cables 150, 180 extend into the interior space 202 such that the connectors 154, 184 may be connected to one or more components 204 or 240 within the server enclosure 200. In one example, the connectors 154, 184 are inserted in and locked to the transceiver 240 on the base 220 in a known manner. The connectors 154, 184, however, may each be connected to different components 204 according to application requirements. To this end, the connectors 154, 184 may be color coded, marked, etc., to aid in securing the correct connector with the corresponding component 204.

The length of the cables 150, 180 extending out through the unobstructed opening 36 can advantageously be adjusted relative to the frame 30 to allow the connectors 154, 184 to reach the component(s) 204. This adjustment capability also allows any excess cable 150, 180 at the first ends 152, 182 to be stored in the storage module 20 and not laying between the storage module and the components 204.

Referring to FIG. 7, the door 206 to the server enclosure 200 is then pivoted closed to close the interior space 202. The notch 208 in the door 206 is aligned with the perimeter of the front of the server enclosure 200 such that the opening 72 in the front wall 70 of the storage module 20 is accessible when the door 206 is closed. More specifically, the opening 72 in the frame 30 is accessible through the closed door 206 to access the interior space 54 of the storage module 20, thereby providing access to the cables 150, 180 therein.

Figure 8:
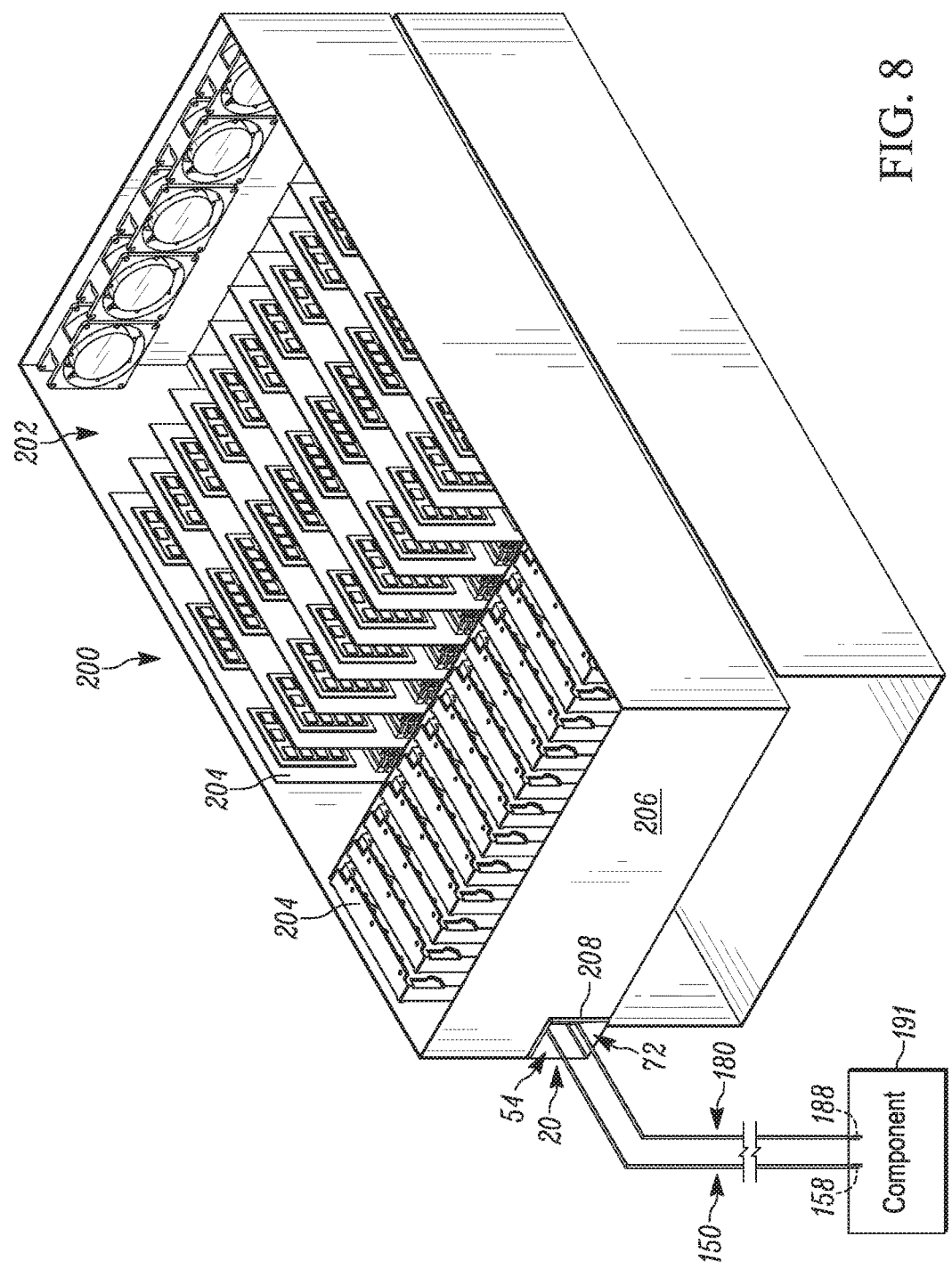
FIG. 8 is a front view of the server enclosure of FIG. 7 with the connectors connected to a component exterior to the server enclosure.

The connectors 158, 188 on the second ends 156, 186 of the cables 150, 180 are pulled through the unobstructed opening 72 in the front wall 70 and the opening 210 in the door 206 to the server enclosure 200 (see FIG. 8). The lengths of second ends 156, 186 extending from the cable storage module 20 may be the same or different, depending on the location of the components external to the server enclosure 200 to which the connectors 158, 188 are to be connected. The lengths of first ends 152, 182 needed may likewise be the same or different, depending on the location of the components interior to the server enclosure 200 to which the connectors 154, 184 are to be connected. In either case, all excess cable 150, 180 length not needed can be compactly retained (e.g., rolled/folded) and stored within the cable storage module 20, thereby affording efficient cable management. Although it is not shown, it can be understood that a long second end 156 may be wrapped around the projection 108, and the end tip of the second end 156 may be secured within the notch 109.

Referring to FIG. 8, the connectors 158, 188 on the second ends 156, 186 of the cables 150, 180 are exposed and configured for connection with component(s) 191 external to the server enclosure 200, such as an external switch, transceiver, etc., which can reside in another server enclosure. In this configuration, the server enclosure 200, with the storage module 20 connected thereto, is ready for storage, transport, installation in a computer rack, etc. The second ends 156, 186 of the cables 150, 180 may take up relatively small real estate on the door 206. The connectors 158, 188 may allow corresponding external cable connectors to directly couple to them. By allowing the lengths of the second ends 156, 186 of the cables 150, 180 to be adjustable independently in each cable storage module 20, the connectors 158, 188 may be positioned at different locations outside of the frame 30, providing better cable management outside of the server enclosure 200. In another example, the connectors 158, 188 may be coupled directly to a patch panel (not shown) in the same rack as the server enclosure 200, eliminating extra cables to connect between the server enclosure 200 and the patch panels.

Similar to the first ends 152, 182 of the cables 150, 180, the length of the cables 150, 180 extending from the frame 30 can selectively be adjusted to allow the connectors 158, 188 to reach the external component(s). This adjustment capability also enables any excess cable 150, 180 at the second ends 156, 186 to be stored in the storage module 20 and not laying between the storage module and the external component(s).

Figure 9:
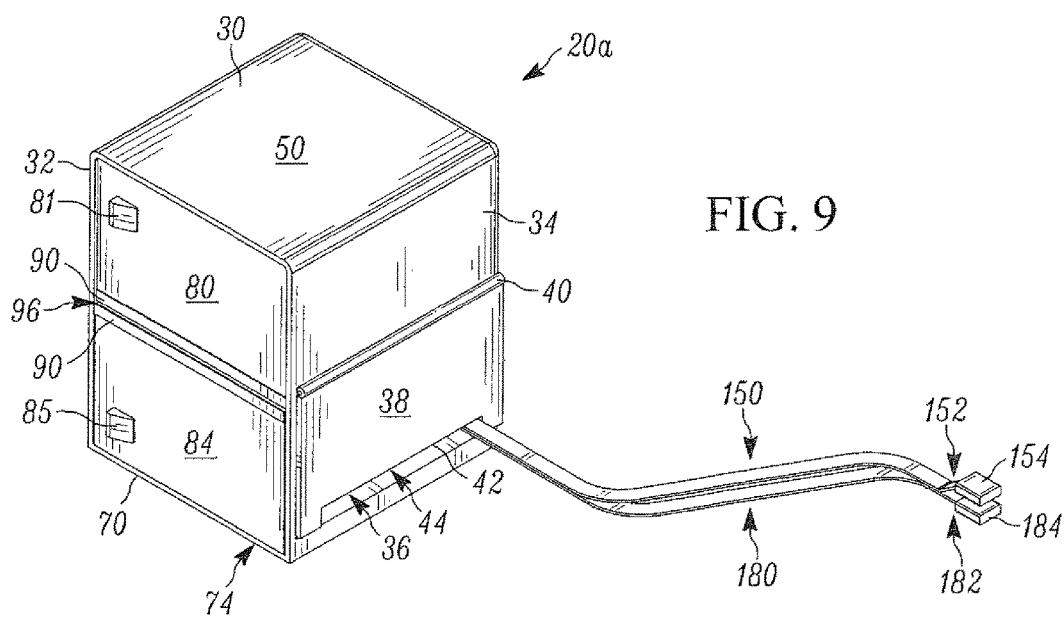
FIG. 9 is a schematic illustration of another example storage module for storing one or more cables.

FIGS. 9-13 illustrate another example storage module 20a for storing one or more cables. Referring to FIG. 9, the opening 36 in the side wall 34 is selectively closed by a door 38. The door 38 may be secured to the side wall 34 via a hinge 40. Alternatively, the door 38 may be releasably secured to the side wall 34, as to be removable from the side wall (not shown). In the illustrated embodiment, the door 38 has an open condition positioned away from the opening 36 and a closed condition coplanar with the side wall 34 and substantially covering the opening. The door 38 includes a notch 42 defining a passage 44 such that a portion of the opening 36 remains unobstructed when the door is in the closed condition. The notch 42 may have polygonal, circular or other shape.

Figure 10A:
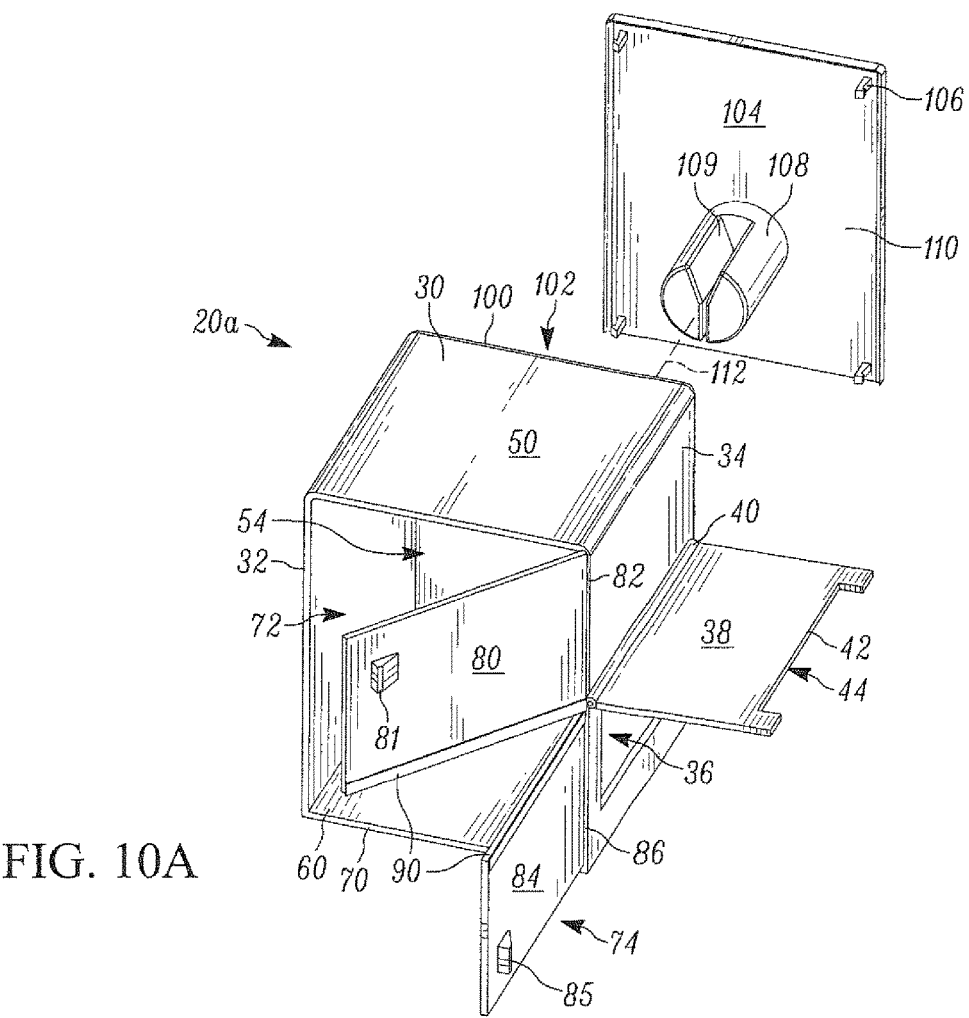
FIG. 10A is a schematic illustration of the storage module of FIG. 9 without cables.
Figure 10B:
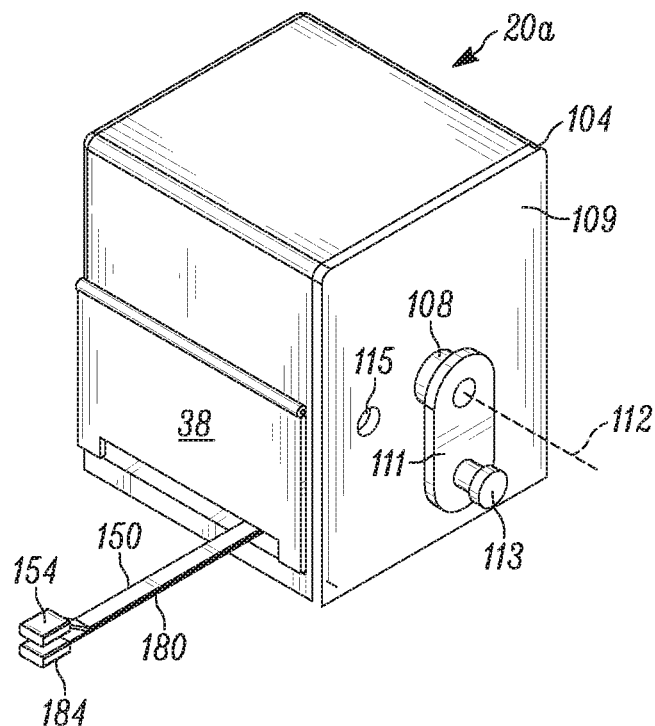
FIG. 10B depicts another example of a portion of the storage module of FIG. 9.

Referring to FIG. 10A, the opening 72 in the front wall 70 is configured to receive a door 74. The door 74 can selectively close the opening 72. The door 74 includes a first portion 80 and second portion 84 which cooperate to close the opening 72. The door 74 may, however, include more or fewer portions for closing the opening 72, wholly or partially. As shown, the first and second portions 80, 84 of the door 74 are secured to the front wall 70 by respective hinges 82, 86. Alternatively, either or both of the portions 80, 84 of the door 74 may be releasably secured to the front wall 70, such as by latches, friction fittings or the like (not shown). Regardless, each portion 80, 84 of the door 74 has an open condition positioned away from the opening 72 and a closed condition coplanar with the front wall 70 and substantially covering a portion of the opening 72. The portions 80, 84 of the door 74 are movable relative to one another between the open and closed conditions. The portions 80, 84 of the door 74 may consist of handles 81, 85. The portions 80, 84 may be released or opened when the handles 81, 85 are pulled or pushed. The portions 80, 84 may be closed when the handles 81, 85 are pushed.

The perimeter segments of the first and second portions 80, 84 parallel and adjacent one another are covered with a gasket 90. The gasket 90 is formed from a resilient material, such as a material (or a coating) to mitigate electromagnetic interference (EMI) or radiofrequency interference (RFI). The gaskets 90 may engage one another or be spaced from one another when the door 74 is closed. In any case, the gaskets 90 form a slot 96 between the first and second portions 80, 86 of the door 74 when the door 74 is closed. Other parts of the frame 30 and/or the notch 42 in the door 38 may also be covered or provided with a coating or be formed of a similar EMI or RFI material (not shown). The opening 102 in the rear wall 100 is selectively closed by the door 104 having the projection 108 extending therefrom for receiving the first cable 150. In another example shown in FIG. 10B, the projection 108 may be coupled to the inner surface 110 and extend through the door 104 in a way that the projection 108 may rotate around the centerline 112. Rotation of the projection 108 may be controlled by employing rotational assist feature on the outer surface 109 of the door 104. In one example, the rotational assist feature is a hand-crank handle 111. In this example, the hand-crank handle 111 may include a push pin 113 secured to and movable relative to the handle for engagement with a locking hole 115 on the outer surface 109 of the door 104 to lock the handle in place. Locking and unlocking of the handle push pin 113 with the locking hole 115 may be achieved by push-to-lock and push-to-unlock mechanism (not shown).

Figure 10C:
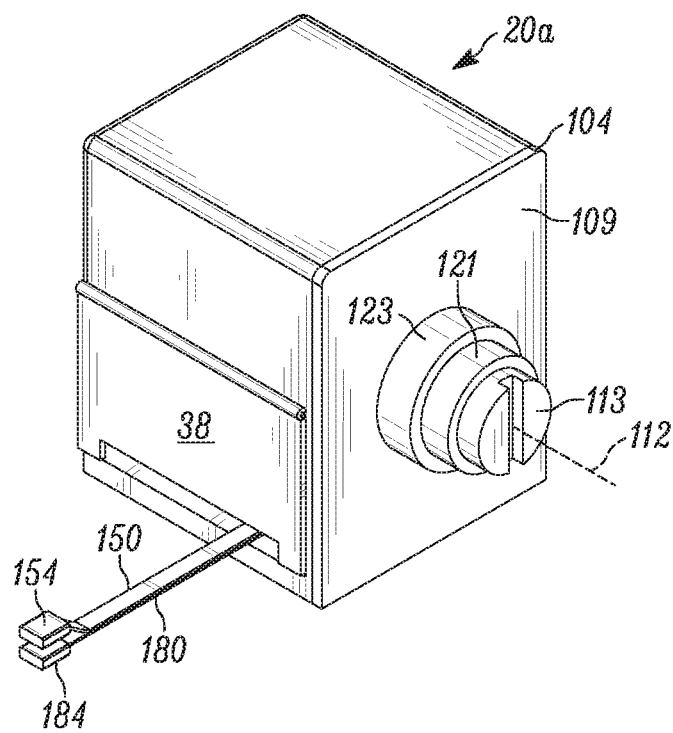
FIG. 10C depicts another example of a portion of the storage module of FIG. 9.
Figure 11:
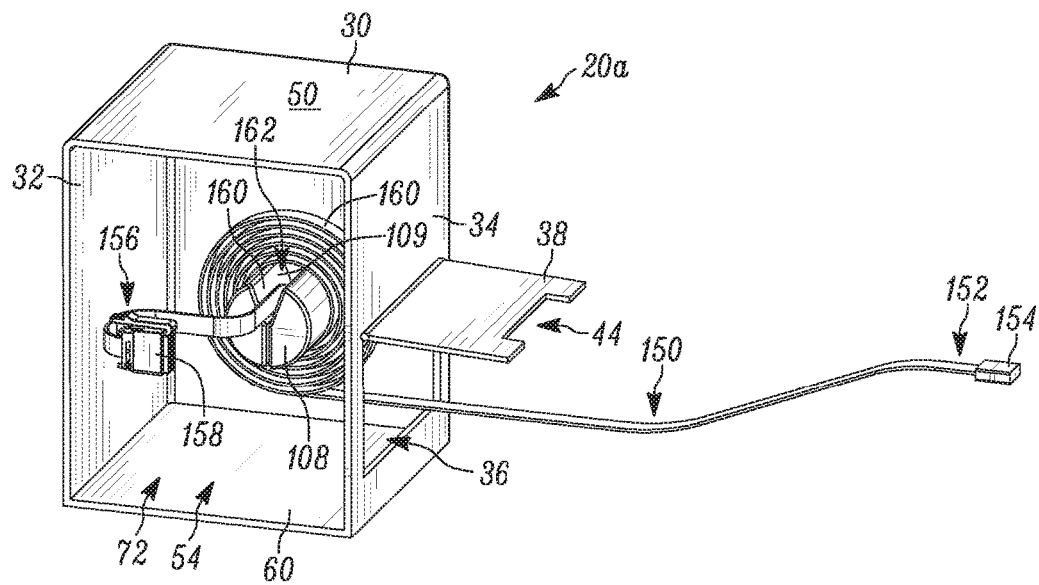
FIG. 11 is a front view of the storage module of FIG. 9 including the example cable of FIG. 2A.

In another example shown in FIG. 10C, the rotational assist feature is a slotted end-face 113 similar to a flat-head bolt. In addition, the rotational assist feature 113 may be surrounded by a rotational restrict feature that restricts the rotation of the projection 108. The rotational restrict feature may be a compression washer 121 that cooperates with a ring-nut 123 to allow or disallow rotation of the projection 108. More specifically, rotating the ring nut 123 in a first direction about the centerline 112 reduces the amount of radial compression of the washer 121 on the bolt 113 to allow the bolt to be rotated. Conversely, rotating the ring nut 123 in a second direction opposite the first direction radially constricts the washer 121 until the bolt 113 can be turned the desired amount.

Referring to FIGS. 9-13, to assemble the module 20a, the door 104 for the rear wall 100 is opened or removed and the rolled cable 150 placed adjacent or abutting the inner surface 110 such that the projection 108 extends through the passage 162 in the rolled cable. The projection 108 and passage 162 may have a loose fit with one another allowing the rolled cable 150 to rotate about the projection. The second end 156 of the cable 150 is received in and extends through the notch 109 in the projection 108. The door 104 is then snap-fit to the frame 30 or hinged closed (not shown) such that the opening 102 is covered and the rolled cable 150, including both connectors 154, 158, is positioned within the interior space 54. The connector 154 on the first end 152 of the cable 150 is then fed through the opening 36 in the side wall 34 with the door 38 opened (see FIG. 11).

Figure 12:
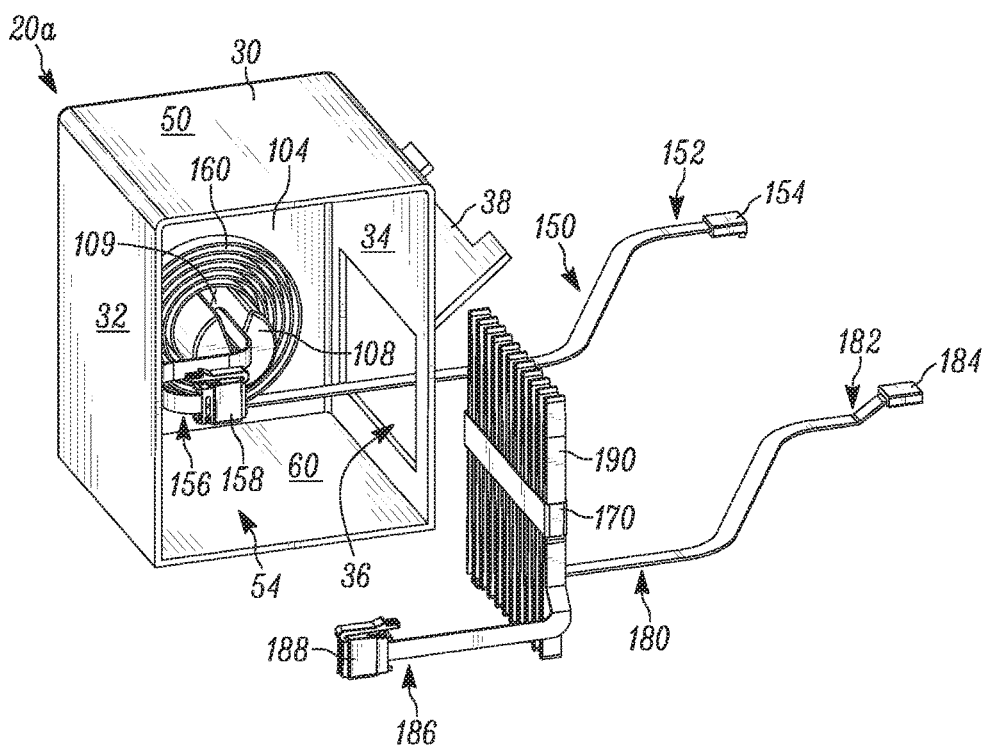
FIG. 12 is a front view of the storage module of FIG. 9 receiving the second cable of FIG. 2B.
Figure 13:
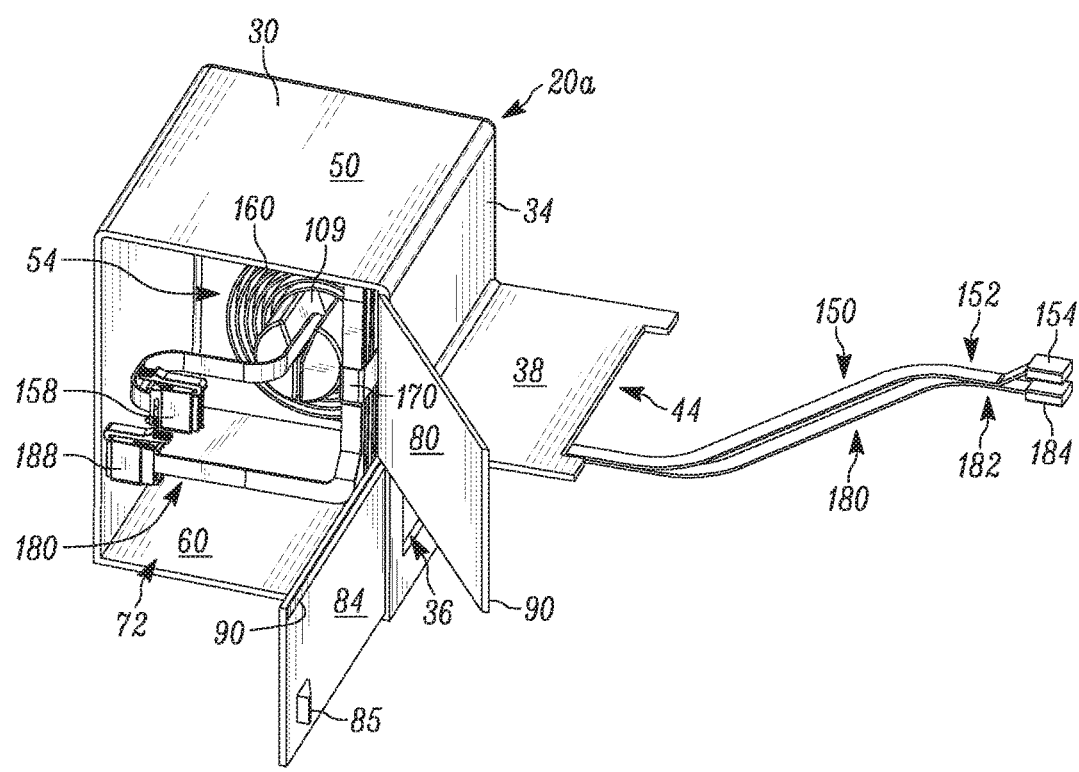
FIG. 13 is a front view of the storage module of FIG. 9 in an open condition for receiving the cables of FIGS. 2A and 2B.
Figure 14:
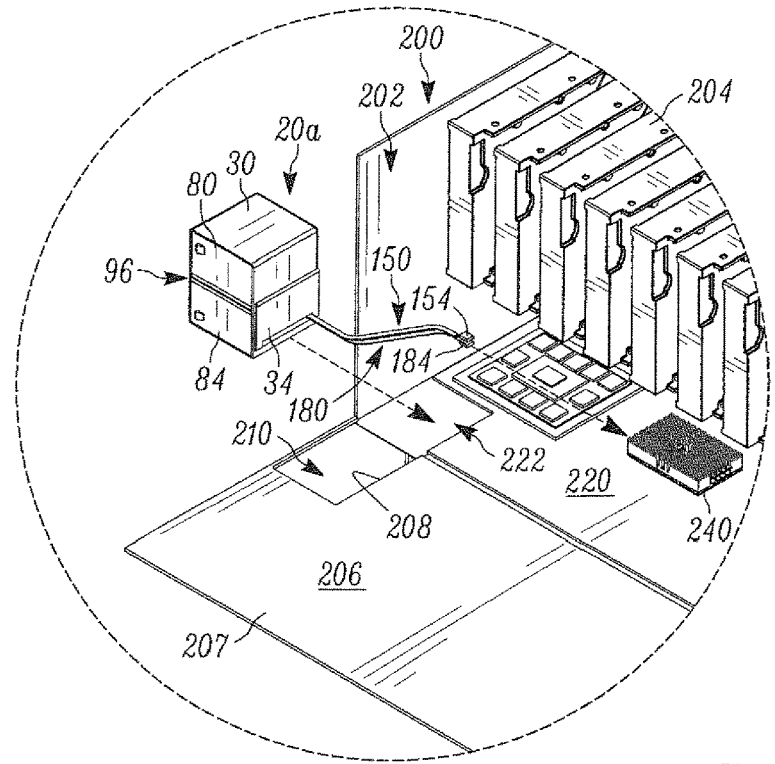
FIG. 14 is an enlarged view of a portion of FIG. 4 with the storage module of FIG. 9 being installed therein.

Referring to FIGS. 12-14, the folded cable 180, including both connectors 184, 188, is positioned within the interior space 54 of the frame 30 adjacent the cable 150. In one example, the cable 180 is positioned along and parallel to the side wall 34 and door 38 of the frame 30. The connector 184 on the first end 182 of the second cable 180 is then fed through the opening 36 in the side wall 34 with the door 38 opened (see FIG. 13).

The door 38 secured to the side wall 34 is closed, thereby closing the opening 36. The first ends 152, 182 of the cables 150, 180 are positioned within the opening 36 in the side wall 34 such that closing the door 38 results in the first ends passing through the passage 44 in the door. The passage 44 formed by the notch 42 allows the first ends 152, 182 of the cables 150, 180 to pass through the side wall 34 without being crimped or held in place. In other words, the first ends 152, 182 of the cables 150, 180 are movable relative to the frame 30 when the door 38 is closed.

Referring to FIG. 9, with the second ends 156, 186 and connectors 158, 188 of the cables 150, 180 positioned within the interior space 54, the first and second portions 80, 84 of the door 74 are closed to cover the opening 72. Consequently, at this time only the first ends 152, 182 and connectors 154, 184 of the cables 150, 180 extend out of the frame 30 when the doors 38, 74, 104 are closed.

Figure 15:
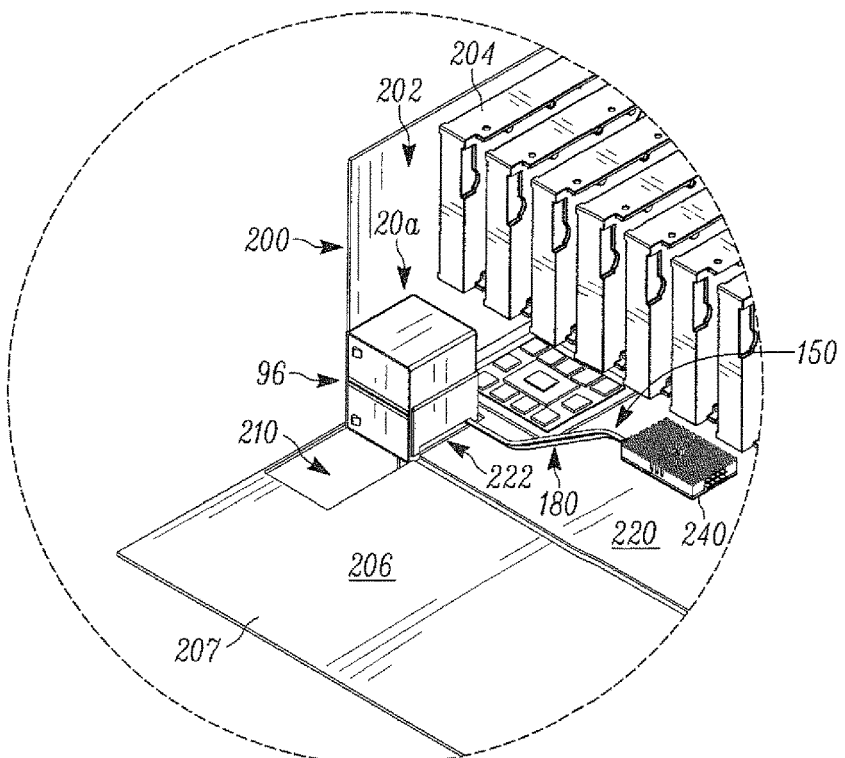
FIG. 15 is an enlarged view of a portion of FIG. 4 with the storage module of FIG. 9 positioned within the server enclosure.

Referring to FIGS. 14-15, with the door 206 of the server enclosure 200 opened, the cable storage module 20a is moved into the interior space 202 with the cable storage module 20a oriented such that the bottom wall 60 abuts the base 220. In this mounting example, the front wall 70 and door 74 face away from the interior space 202. In one position example for the cable storage module 20a, the notch 222 may be configured such that the front door 74 is substantially coplanar with the front of the server enclosure 200. Alternatively, the cable storage module 20a may extend through the front of the server enclosure 200 or be rearwardly offset from the front (not shown). Regardless, the first ends 152, 182 of the cables 150, 180 extend into the interior space 202 such that the connectors 154, 184 may be connected to one or more components 204 or 240 within the server enclosure 200. The length of the cables 150, 180 extending out through the passage 44 in the door 38 can advantageously be adjusted to allow the connectors 154, 184 to reach the component(s) 204. This adjustment capability also allows any excess cable 150, 180 at the first ends 152, 182 to be stored in the storage module 20a and not laying between the storage module and the components 204.

Figure 16:
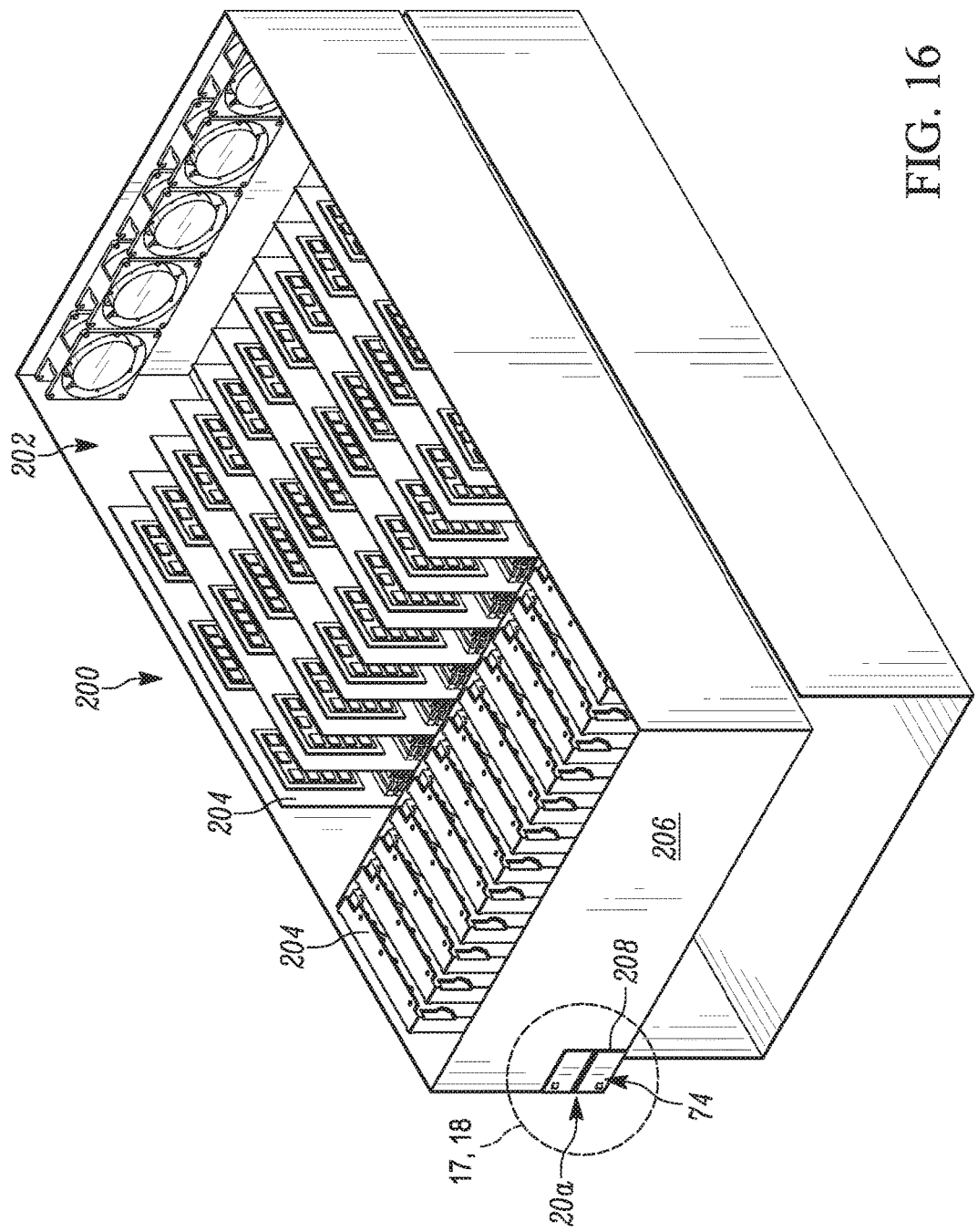
FIG. 16 is a front view of the server enclosure of FIG. 4 with the front door closed.

Referring to FIG. 16, the door 206 to the server enclosure 200 is then pivoted closed to close the interior space 202. The notch 208 in the door 206 is aligned with the perimeter of the front of the server enclosure 200 such that the door 74 of the storage module 20a is accessible when the door 206 is closed. More specifically, the first and second portions 80, 84 of the door 74 can be opened and closed through the opening 210 in the door 206 to access the interior space 54 of the storage module 20a, thereby providing access to the cables 150, 180 therein.

Figure 17:
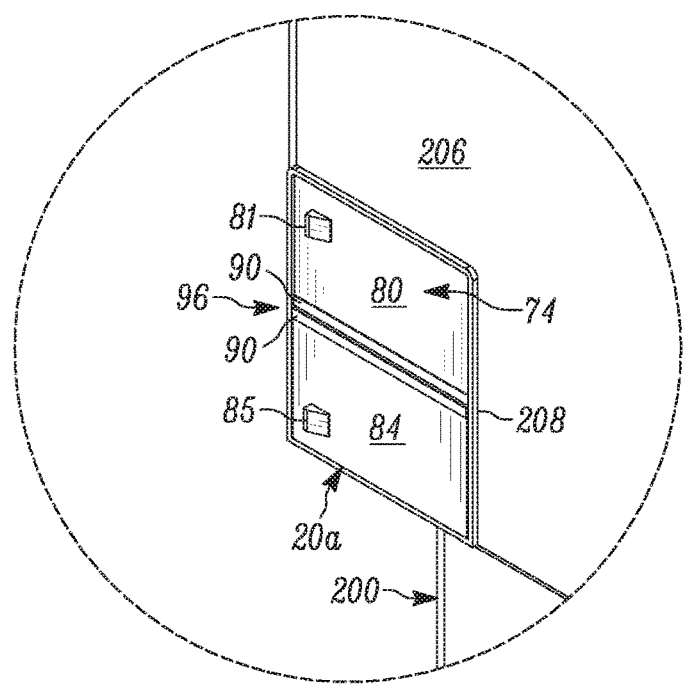
FIG. 17 is an enlarged view of a portion of FIG. 16.

One or both of the portions 80, 84 of the door 74 is opened and the connectors 158, 188 on the second ends 156, 186 of the cables 150, 180 are pulled through the opening 72 in the front wall 70 and the opening 210 in the door 206 of the server enclosure 200 (see FIG. 17). The portions 80, 84 of the door 74 are then closed such that the cables 150, 180 extend through the slot 96 between the gaskets 90. The resilient construction of the gaskets 90 applies a frictional force to the cables 150, 180 to thereby resist movement thereof. In other words, the frictional force of the gaskets 90 holds the cables 150, 180 in place, but the frictional force can be overcome to move the cables relative to the slot 96. The cables 150, 180 may have strain relief clips (not shown), where the friction force of the gaskets 90 holds the strain relief clips to in turn hold the cables 150, 180. The strain relief clips may be slid along the cables 150, 180 freely to be positioned properly when they are not held by the friction force of the gaskets 90. The EFI/RFI material used to form the gaskets 90 advantageously helps maintain the integrity of any signals passing through the second ends 156, 186 of the cables 150, 180.

The lengths of first ends 152, 182 needed may be the same or different, depending on the location of the components interior to the server enclosure 200 to which the connectors 154, 184 are to be connected. The lengths of second ends 156, 186 extending from the cable storage module may likewise be the same or different, depending on the location of the components exterior to the server enclosure 200 to which the connectors 158, 188 are to be connected. In either case, all excess cable 150, 180 length not needed can be compactly retained (e.g., rolled/folded) and stored within the cable storage module 20a, thereby affording efficient cable management.

Figure 18:
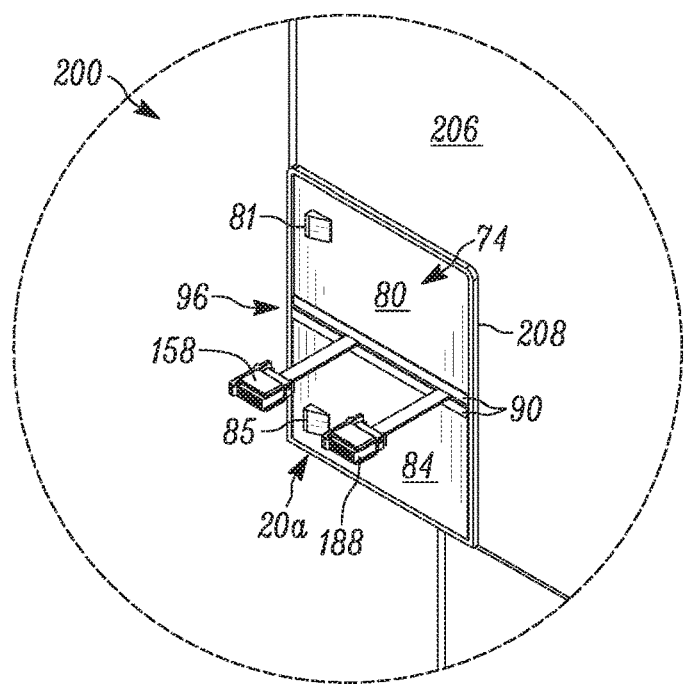
FIG. 18 is an enlarged view of a portion of FIG. 16 with connectors extending through the door.
Figure 19:
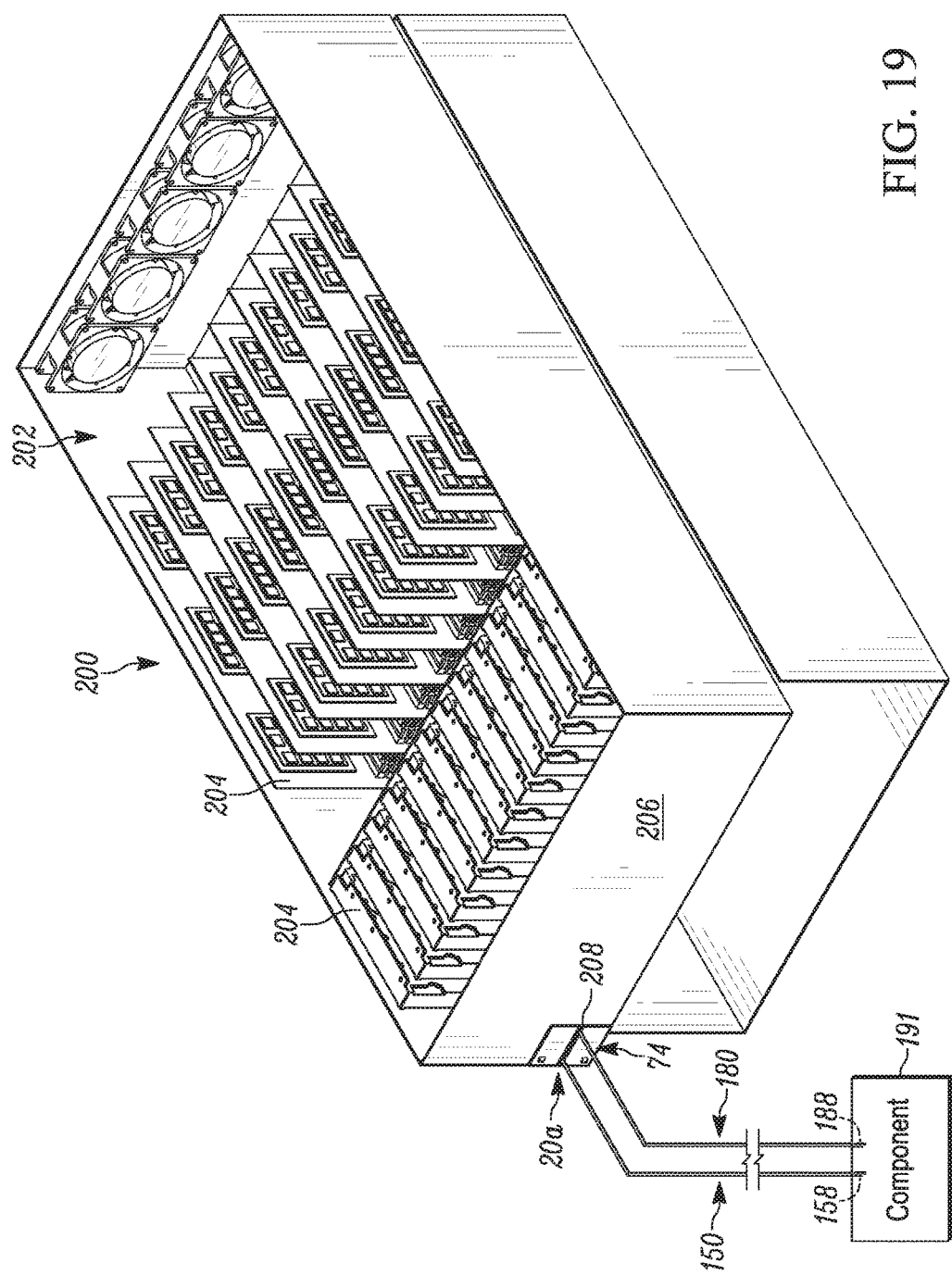
FIG. 19 is a front view of the server enclosure of FIG. 16 with the connectors connected to a component exterior to the server enclosure.

Referring to FIGS. 18-19, with the door 74 of the cable storage module 20a closed, the connectors 158, 188 on the second ends 156, 186 of the cables 150, 180 are exposed and configured for connection with component(s) 191 external to the server enclosure 200, such as an external switch, transceiver, etc. In this configuration, the server enclosure 200, with the storage module 20a connected thereto, is ready for storage, transport, installation in a computer rack, etc. The second ends 156, 186 of the cables 150, 180 through the slot 96 may take up relatively small real estate on the door 206. The connectors 158, 188 may allow corresponding external cable connectors to directly couple to them. By allowing the lengths of the second ends 156, 186 of the cables 150, 180 to be adjustable independently in each cable storage module 20a, the connectors 158, 188 may be positioned at different locations outside of the door 74, providing better cable management outside of the server enclosure 200. In another example, the connectors 158, 188 may be coupled directly to a patch panel (not shown) in the same rack as the server enclosure 200, eliminating extra cables to connect between the server enclosure 200 and the patch panels.

Figure 20:
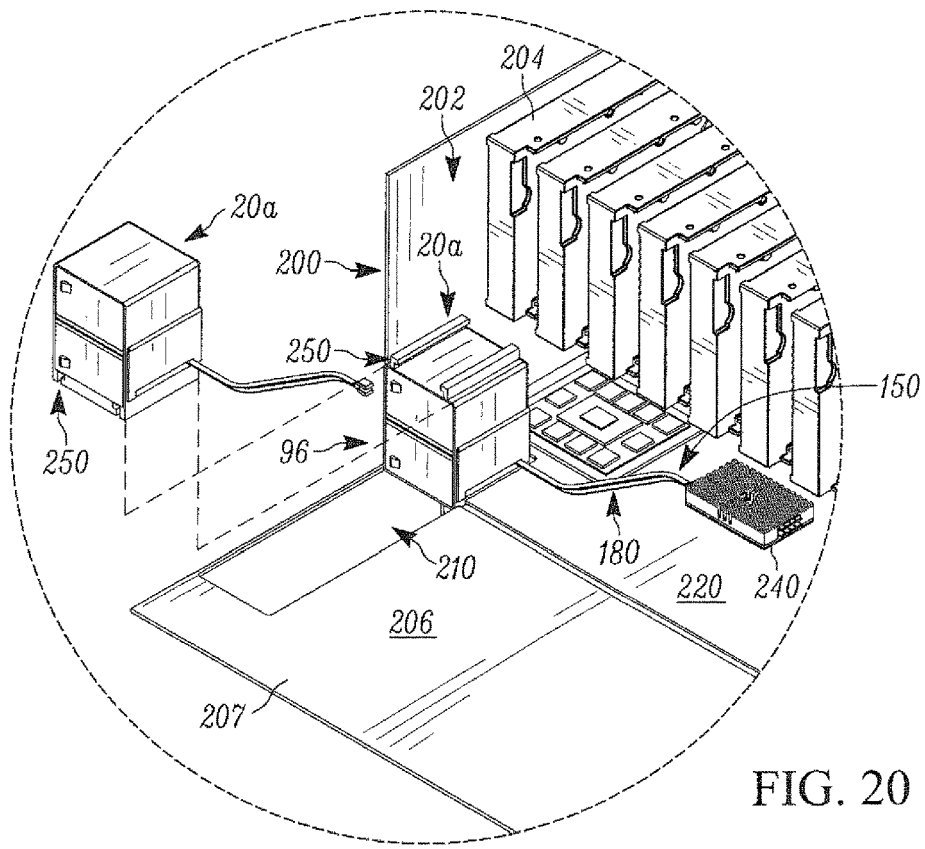
FIG. 20 is an enlarged view of a server enclosure receiving multiple storage modules.
Figure 21:
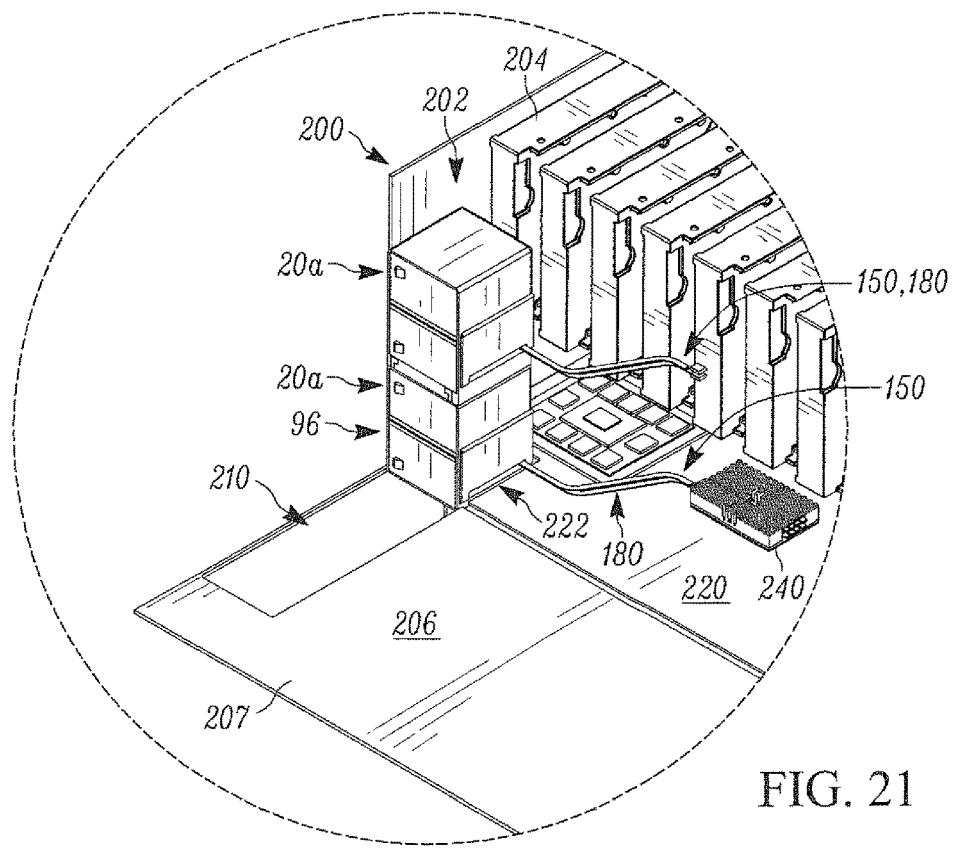
FIG. 21 is an enlarged view of the server enclosure of FIG. 20 with the storage modules stacked atop one another.

Although the enclosure 200 is shown and described as utilizing a single cable storage module 20a, it will be appreciated that multiple cable storage modules may be positioned within the interior space 202 for connecting multiple internal components with multiple external components. Referring to FIGS. 20-21, the notch 208 in the door 206 is sized to allow the front doors 74 of each cable storage module 20a to be opened and closed while the door 206 is closed. The connectors 154, 184 associated with each cable storage module 20a may be secured to the same internal component 204 or different internal components. The connectors 158, 188 associated with each cable storage module 20a may be secured to the same exterior component 191 or different exterior components. To this end, the cable storage modules 20a may be marked with indicia, colored or otherwise marked (not shown) to correspond with a particular connection to be made between internal and external components. Moreover, the cable storage modules 20a may be stacked atop or alongside one another and interconnected via tongue-and-groove structure 250, snap connection (not shown), or similar to secure the storage modules together. In other examples, the cable storage modules 20a may be secured together by a bracket (not shown) where the bracket may be secured within the enclosure interior space, or the cable storage modules 20a may be secured directly or by means of a bracket on the interior wall 207 of the door 206.

The apparatus and modules is advantageous in that the cable storage module 20, 20a eliminates the need for jumper cables, which are typically required in the connection between a component within the server enclosure 200 and a component exterior to the server enclosure. In particular, the cable storage module 20, 20a stores the rolled/folded cables 150, 180 in a compact manner such that no additional connection is needed within the cable storage module. Eliminating the extra jumper cables helps reduce cost and signal attenuation through the cables 150, 180, and improve connection reliability, by reducing the number of connections between the internal and external components.

Furthermore, the cable storage module 20, 20a provides cable management in that only the amount of cable 150, 180 needed to make the connections to the components is used while the excess is compactly rolled/folded and stored within the enclosure. The cable storage module 20, 20a therefore provides a pre-wired device for simple and efficient installation into a server enclosure 200.

The doors 38, 74, 104 described herein are advantageous in that each may be removed or opened to allow for one or both cables 150, 180 to be inspected, adjusted, removed or changed. Since the doors 38, 74, 104 are accessible through the opening 210 in the door 206 the cables 150, 180 can be inspected, adjusted, removed or changed without necessitating removal of the cable storage module 20a from the server enclosure 200.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system comprising:
   a chassis having an interior containing a first component and a second component secured to a base; and
   a first cable storage module attached to the chassis and having a frame defining an interior space in which a first cable is stored, the first cable having a first end extending out of the frame for connection to the first component and a second end extending from the frame for connection to a first device exterior to the chassis; and
   a second cable storage module disposed on top of and interconnected with the first cable storage module in a stacked arrangement, the second storage module having a frame defining an interior space in which a second cable is stored, the second cable having a first end extending out of the frame of the second cable storage module for connection to a second component within the interior of the chassis and a second end extending out of the frame of the second cable storage module for connection to a second device exterior to the chassis.

2. The system of claim 1, wherein the first component is connectable to the base prior to connection of the first end of the first cable to the first component.

3. The system of claim 1, the first component has a connector along its outer periphery for direct connection to the first end of the first cable.

4. The system of claim 1, further comprising at least another cable positioned in the interior space of the first cable storage module and having a first end extending out of the frame of the first cable storage module for connection to the first component and a second end extending out of the frame of the first cable storage module for connection to the first exterior device.

5. The system of claim 1, wherein the first cable includes a bundled portion within the interior space of the frame of the first cable storage module that is one of folded and rolled therein, and
   wherein a length of the first end of the first cable extending out of the frame of the first cable storage module is adjustable and a length of the second end of the first cable extending out of the frame of the first cable storage module is adjustable.

6. The system of claim 1, wherein each of the first cable and the second cable is one of an electrical cable or an optical cable.

7. The system of claim 1, wherein the second component is connectable to the base prior to connection of the first end of the second cable to the second component.

8. The system of claim 1, the second component has a connector along its outer periphery for direct connection to the first end of the second cable.

9. The system of claim 1, further comprising at least another cable positioned in the interior space of the second cable storage module and having a first end extending out of the frame of the second cable storage module for connection to the second component and a second end extending out of the frame of the second cable storage module for connection to the second exterior device.

10. The system of claim 1, wherein the second cable includes a bundled portion within the interior space of the frame of the second cable storage module that is one of folded and rolled therein, and wherein a length of the first end of the second cable extending out of the frame of the second cable storage module is adjustable and a length of the second end of the second cable extending out of the frame of the second cable storage module is adjustable.

11. A method of connecting components comprising:

attaching a first cable storage module with respect to a chassis, the chassis having an interior containing a first component secured to a base, the first cable storage module including a frame defining an interior space in which a first cable is stored, the first cable having first and second ends;

coupling a second cable storage module with the first storage cable module, the second cable storage module disposed on top of the first cable storage module in a stacked arrangement, and the second storage module including a frame defining an interior space in which a second cable is stored, the second cable having first and second ends, connecting the first end of the first cable with the first component while the first component is attached to the base;

connecting the first end of the second cable with the second component while the second component is attached to the base;

connecting the second end of the first cable with a first device exterior to the chassis; and connecting the second end of the second cable with a second device exterior to the chassis.

12. The method of claim 11, wherein coupling the second cable storage module with the first storage cable module further comprises interlocking the first cable storage module with the second cable storage module attached to the chassis.

13. The method of claim 11, further comprising at least another cable positioned in the interior space of the first cable storage module and having a first end extending out of the frame of the first cable storage module for connection to the first component and a second end extending out of the frame of the first cable storage module for connection to the first exterior device.

14. The method of claim 11, wherein the first cable includes a bundled portion within the interior space of the frame of the first cable storage module that is one of folded and rolled therein, and wherein a length of the first end of the first cable extending out of the frame of the first cable storage module is adjustable and a length of the second end of the first cable extending out of the frame of the first cable storage module is adjustable.

15. The method of claim 11, further comprising at least another cable positioned in the interior space of the second cable storage module and having a first end extending out of the frame of the second cable storage module for connection to the second component and a second end extending out of the frame of the second cable storage module for connection to the second exterior device.

16. The method of claim 11, wherein the second cable includes a bundled portion within the interior space of the frame of the second cable storage module that is one of folded and rolled therein, and wherein a length of the first end of the second cable extending out of the frame of the second cable storage module is adjustable and a length of the second end of the second cable extending out of the frame of the second cable storage module is adjustable.

17. A system comprising:

a chassis having an interior containing a first component and a second component secured to a base; and a first cable storage module positioned within the interior and having a frame defining an interior space in which a first cable is stored, the first cable having a first end extending out of the frame for connection to the first component and a second end extending out of the frame for connection to a first device exterior to the chassis; and a second cable storage module disposed on and interconnected with the first cable storage module in a stacked arrangement, the second storage module having a frame defining an interior space in which a second cable is stored, the second cable having a first end extending out of the frame of the second cable storage module for connection to a second component and a second end extending out of the frame of the second cable storage module for connection to a second device exterior to the chassis, wherein a length of the first end of the first cable extending out of the frame of the first cable storage module is adjustable and a length of the second end of the first cable extending out of the frame of the first cable storage module is adjustable, a length of the first end of the second cable extending out of the frame of the second cable storage module is adjustable and a length of the second end of the second cable extending out of the frame of the second cable storage module is adjustable, the first component is connectable to the base prior to connection of the first end of the first cable to the first component, and the second component being connectable to the base prior to connection of the first end of the second cable to the second component.

18. The system of claim 17, wherein each of the first cable and the second cable is one of an electrical cable or an optical cable.

* * * * *